(12) United States Patent
Schoenauer et al.

(10) Patent No.: US 11,924,346 B2
(45) Date of Patent: Mar. 5, 2024

(54) EFFICIENT AND MASKED SAMPLING OF POLYNOMIALS FOR LATTICE-BASED CRYPTOGRAPHY

(71) Applicant: NXP B.V., Eindhoven (NL)

(72) Inventors: Markus Schoenauer, Vienna (AT);
Tobias Schneider, Craz (AT); Joost Roland Renes, Eindhoven (NL);
Melissa Azouaoui, Norderstedt (AT)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 17/732,164

(22) Filed: Apr. 28, 2022

(65) Prior Publication Data

US 2023/0353361 A1    Nov. 2, 2023

(51) Int. Cl.
*H04L 9/30* (2006.01)
*G06F 9/30* (2018.01)

(52) U.S. Cl.
CPC ........ *H04L 9/3093* (2013.01); *G06F 9/30018* (2013.01); *H04L 9/3026* (2013.01)

(58) Field of Classification Search
CPC .. H04L 9/3093; H04L 9/3026; G06F 9/30018
See application file for complete search history.

(56) References Cited

U.S. PATENT DOCUMENTS

| 11,502,819 B2 | 11/2022 | Schneider et al. |
| 11,528,124 B2 | 12/2022 | Gourjon et al. |
| 11,595,195 B2 | 2/2023 | Schneider et al. |
| 2002/0184025 A1 | 12/2002 | Barron et al. |
| 2015/0381348 A1* | 12/2015 | Takenaka ............. H04L 9/3093 380/30 |
| 2016/0352510 A1* | 12/2016 | Morikawa ................ G09C 1/00 |
| 2019/0312728 A1* | 10/2019 | Poeppelmann ....... H04L 9/0662 |
| 2019/0379529 A1* | 12/2019 | Meyer .................... H04L 9/008 |
| 2020/0265167 A1 | 8/2020 | Banerjee et al. |

OTHER PUBLICATIONS

Higher-Order Masked Ciphertext Comparison for Lattice-Based Cryptography, by Van et al.; published 2021 (Year: 2021).*
High-Speed Masking for Polynomial Comparison in Lattice-based KEMs, by Bache et al.; published 2020 (Year: 2020).*

(Continued)

*Primary Examiner* — Vu V Tran

(57) ABSTRACT

Various embodiments relate to a data processing system comprising instructions embodied in a non-transitory computer readable medium, the instructions for masked sampling of polynomials for lattice-based cryptography in a processor, the instructions, including: determining a number m of random bits to be sampled based upon a sample bound parameter $\beta$; producing a plurality of Boolean masked shares of a polynomial coefficient each having the determined number m of random bits using a uniform random function; determining that the polynomial coefficient is within a range of values based upon the sample bound parameter $\beta$; converting the plurality of Boolean masked shares of the polynomial coefficient to a plurality of arithmetic masked shares of the polynomial coefficient; and shifting the plurality of arithmetic masked shares based upon the sample bound parameter $\beta$.

20 Claims, 1 Drawing Sheet

(56) References Cited

OTHER PUBLICATIONS

National Institute of Standards and Technology; "Post-Quantum Cryptography; Post-Quantum Cryptography Standardization"; Created Jan. 3, 2017, Updated Jul. 17, 2023; From the Internet: https://csrc.nist.gov/Projects/post-quantum-cryptography/post-quantum-cryptography-standardization.

L. Ducas, Elke Kiltz, Tancrede Lepoint, Vadim Lyubashevsky, P. Schwabe, Gregor Seiler, and D. Stehle, "Crystals-dilithium algorithm specifications and supporting documentation (version 3.1)", 2021.

Michiei Van Beirendonck, et al.; "A side-channel-resistant implementation of SABER", ACM J. Emerg. Technol. Comput. Syst. 17 (2021), No. 2, 10:1-10:26.

Joppe Joppe W. Bos, et al., "Masking kyber: First- and higher-order implementations", IACR Trans. Cryptogr. Hardw. Embed. Syst. 2021 (2021), No. 4, 173-214.

Tobias Schneider et al., "Efficiently masking binomial sampling at arbitrary orders for lattice-based crypto", Public-Key Cryptography—PKC 2019—22nd IACR International Conference on Practice and Theory of Public-Key Cryptography, Beijing, China, Apr. 14-17, 2019, Proceedings, Part II (Dongdai Lin and Kazue Sako, eds.), Lecture Notes in Computer Science, vol. 11443, Springer, 2019, pp. 534-564.

Frangois Gerard and Melissa Rossi, An efficient and provable masked implementation of qtesla, Smart Card Research and Advanced Applications—18th International Conference, CARDIS 2019, Prague, Czech Republic, Nov. 11-13, 2019, Revised Selected Papers (Sonia Bela:id and Tim Giineysu, eds.), Lecture Notes in Computer Science, vol. 11833, Springer, 2019, pp. 74-91.

Vadim Lyubashevsky, Chris Peikert, and Oded Regev, On ideal lattices and learning with errors over rings, EUROCRYPT 2010 (Henri Giibert, ed.), Springer Berlin Heidelberg, 2010, pp. 1-23.

Tobias Oder, Tobias Schneider, Thomas Poppelmann, and Tim Giineysu, Practical cca2-secure and masked ring-Iwe implementation, IACR Trans. Cryptogr. Hardw. Embed. Syst. 2018 (2018), No. 1, 142-174.

Oded Regev, On lattices, learning with errors, random linear codes, and cryptography, ACM Symposium on Theory of Computing 2005 (Harold N. Gabow and Ronald Fagin, eds.), ACM, 2005, pp. 84-93.

Matthieu Rivain and Emmanuel Prouff, Provably secure higher-order masking of AES, Cryptographic Hardware and Embedded Systems, CHES 2010, 12th International Workshop, Santa Barbara, CA, USA, Aug. 17-20, 2010. Proceedings (Stefan Mangard and Frarn;ois-Xavier Standaert, eds.), Lecture Notes in Computer Science, vol. 6225, Springer, 2010, pp. 413-427.

Sujoy Sinha Roy, Oscar Reparaz, Frederik Vercauteren, and Ingrid Verbauwhede, Compact and side channel secure discrete gaussian sampling, IACR Cryptol. ePrint Arch. (2014), 591.Crypto.

\* cited by examiner

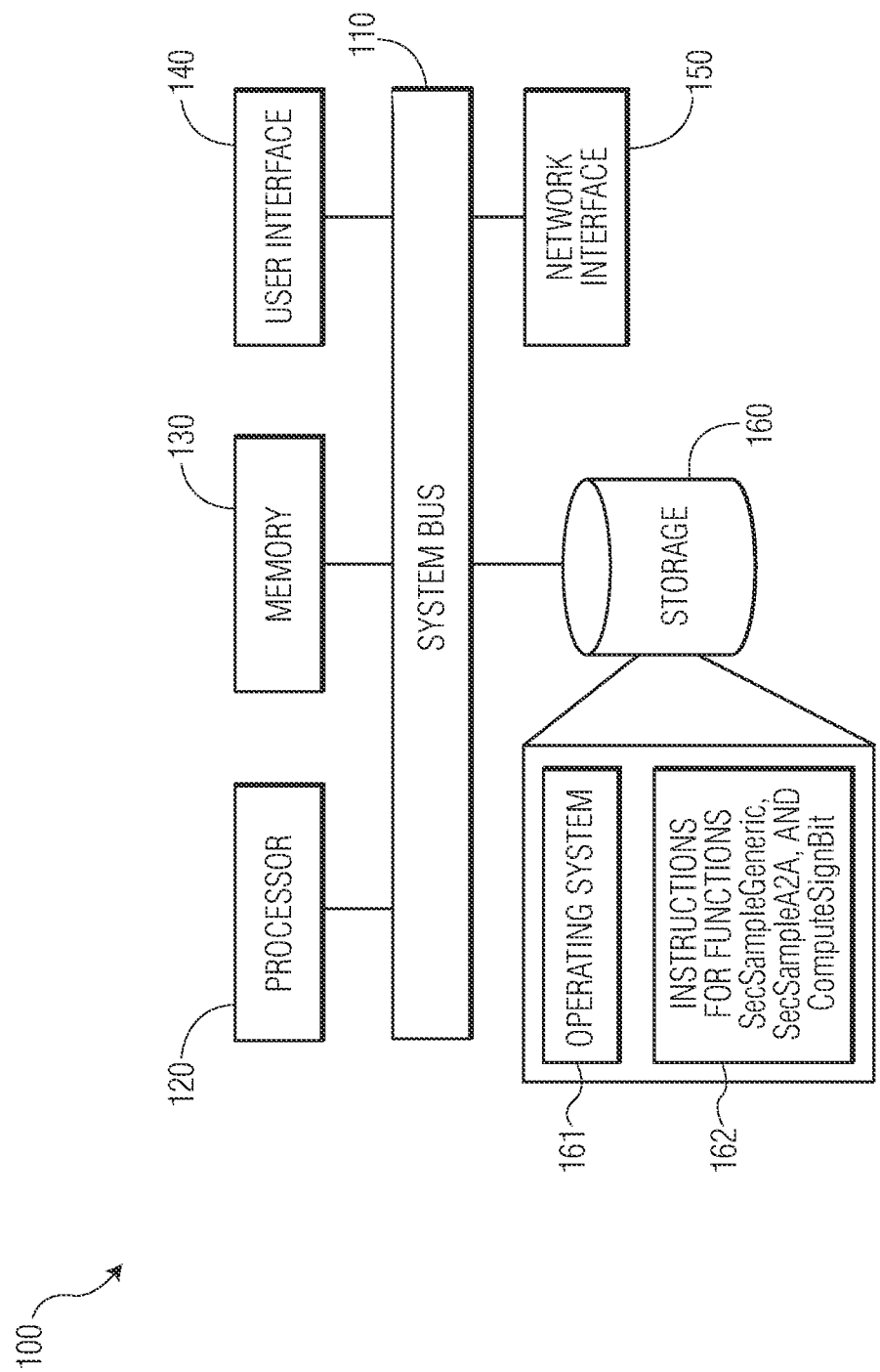

EFFICIENT AND MASKED SAMPLING OF POLYNOMIALS FOR LATTICE-BASED CRYPTOGRAPHY

TECHNICAL FIELD

Various exemplary embodiments disclosed herein relate generally to efficient and masked sampling of polynomials for lattice-based cryptography.

BACKGROUND

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST). The selection procedure for this new cryptographic standard has started and has further accelerated the research of post-quantum cryptography schemes.

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework: the Ring-Learning With Errors problem. One of the leading lattice-based signature schemes is DILITHIUM which requires operations involving arithmetic with polynomials with integer coefficients. When implemented, the main computationally expensive operations are the arithmetic with polynomials. More precisely, computations are done in a ring $R_q=(\mathbb{Z}/q\mathbb{Z})[X]/(F)$: the ring where polynomial coefficients are in $\mathbb{Z}/q\mathbb{Z}$ and the polynomial arithmetic is performed modulo a polynomial F.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system comprising instructions embodied in a non-transitory computer readable medium, the instructions for masked sampling of polynomials for lattice-based cryptography in a processor, the instructions, including: determining a number m of random bits to be sampled based upon a sample bound parameter β; producing a plurality of Boolean masked shares of a polynomial coefficient each having the determined number m of random bits using a uniform random function; determining that the polynomial coefficient is within a range of values based upon the sample bound parameter β; converting the plurality of Boolean masked shares of the polynomial coefficient to a plurality of arithmetic masked shares of the polynomial coefficient; and shifting the plurality of arithmetic masked shares based upon the sample bound parameter β.

Various embodiments are described, further comprising when the polynomial coefficient is not within the range of values, repeating the step of producing a plurality of Boolean masked shares of a polynomial coefficient each having the determined number m of random bits using a uniform random function until the polynomial coefficient is within the range of values.

Various embodiments are described, wherein m=NumberOfBits(β)+1−τ, where τ is a bound indicator having a value of 0 or 1 and the function NumberOfBits determines the number of bits needed to represent an input value.

Various embodiments are described, wherein the plurality of Boolean masked shares of the polynomial coefficient have a value in the range of $[0, 2^m-1]$.

Various embodiments are described, wherein the range of values is $[0, 2\beta-\tau]$ where τ is a bound indicator having a value of 0 or 1.

Various embodiments are described, wherein determining that the polynomial coefficient is within a range of values includes determining the sign bit of x−2β−1 where x is the polynomial coefficient.

Various embodiments are described, wherein shifting the plurality of arithmetic masked shares includes shifting one of the plurality of arithmetic masked shares by −β+τ, where T is a bound indicator having a value of 0 or 1.

Further various embodiments relate to a data processing system comprising instructions embodied in a non-transitory computer readable medium, the instructions for masked sampling of polynomials for lattice-based cryptography in a processor, the instructions, including: producing a plurality of first arithmetic masked shares with a first modulus of a polynomial coefficient each having a value in a range based upon a sample bound parameter β by using a uniform random sampling function, wherein outputs of the uniform random sampling function outside the range are rejected; converting the plurality of first arithmetic masked shares of the polynomial coefficient to a plurality of second arithmetic masked shares of the polynomial coefficient having a second modulus different from the first modulus; and shifting the plurality of second arithmetic masked shares based upon the sample bound parameter β.

Various embodiments are described, wherein the plurality of first arithmetic masked shares of the polynomial coefficient have a value in the range of $[0,2\beta+1-\tau]$, where τ is a bound indicator having a value of 0 or 1.

Various embodiments are described, wherein shifting the plurality of second arithmetic masked shares includes shifting one of the second plurality of arithmetic masked shares by −β+τ, where τ is a bound indicator having a value of 0 or 1.

Further various embodiments relate to a method for masked sampling of polynomials for lattice-based cryptography, including: determining a number m of random bits to be sampled based upon a sample bound parameter β; producing a plurality of Boolean masked shares of a polynomial coefficient each having the determined number m of random bits using a uniform random function; determining that the polynomial coefficient is within a range of values based upon the sample bound parameter β; converting the plurality of Boolean masked shares of the polynomial coefficient to a plurality of arithmetic masked shares of the polynomial coefficient; and shifting the plurality of arithmetic masked shares based upon the sample bound parameter β.

Various embodiments are described, further comprising when the polynomial coefficient is not within the range of values, repeating the step of producing a plurality of Boolean masked shares of a polynomial coefficient each having the determined number m of random bits using a uniform random function until the polynomial coefficient is within the range of values.

Various embodiments are described, wherein m =NumberOfBits($\beta$)+1−$\tau$, where $\tau$ is a bound indicator having a value of 0 or 1 and the function NumberOfBits determines the number of bits needed to represent an input value.

Various embodiments are described, wherein the plurality of Boolean masked shares of the polynomial coefficient have a value in the range of $[0,2^m-1]$.

Various embodiments are described, wherein the range of values is $[0,2\beta-\tau]$ where $\tau$ is a bound indicator having a value of 0 or 1.

Various embodiments are described, wherein determining that the polynomial coefficient is within a range of values includes determining the sign bit of $x-2\beta-1$ where x is the polynomial coefficient.

Various embodiments are described, wherein shifting the plurality of arithmetic masked shares includes shifting one of the plurality of arithmetic masked shares by $-\beta+\tau$, where $\tau$ is a bound indicator having a value of 0 or 1.

Further various embodiments relate to a method for masked sampling of polynomials for lattice-based cryptography in a processor, the instructions, including: producing a plurality of first arithmetic masked shares of a polynomial coefficient each having a value in a range based upon a sample bound parameter $\beta$ by using a uniform random sampling function, wherein outputs of the uniform random sampling function outside the range are rejected; producing a plurality of first arithmetic masked shares with a first modulus of a polynomial coefficient each having a value in a range based upon a sample bound parameter $\beta$ by using a uniform random sampling function, wherein outputs of the uniform random sampling function outside the range are rejected; and shifting the plurality of second arithmetic masked shares based upon the sample bound parameter $\beta$.

Various embodiments are described, wherein the plurality of first arithmetic masked shares of the polynomial coefficient have a value in the range of $[0,2\beta+1-\tau]$, where $\tau$ is a bound indicator having a value of 0 or 1.

Various embodiments are described, wherein shifting the plurality of second arithmetic masked shares includes shifting one of the second plurality of arithmetic masked shares by $-\beta+\tau$, where $\tau$ is a bound indicator having a value of 0 or 1.

BRIEF DESCRIPTION OF THE DRAWINGS

In order to better understand various exemplary embodiments, reference is made to the accompanying drawings, wherein:

FIG. 1 illustrates an exemplary hardware diagram 100 for implementing the generation of masked uniformly distributed coefficients including the functions SecSampleGeneric, SecSampleA2A, and ComputeSignBit.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The signing operation of a digital signature scheme generates a signature for a given message using a secret key. If this secret key was to be leaked, it would invalidate the security properties provided by the scheme. It has been shown in that unprotected implementations of post-quantum signature schemes are vulnerable to implementation attacks, e.g., side-channel analysis. In particular, it was demonstrated that the secret key may be extracted from physical measurements of key-dependent parts in the signing operation. For several post-quantum digital signature schemes, the key-dependent operations include the sampling of polynomials with uniform coefficients in a given range. For DILITHIUM (a lattice-base signature scheme submitted to NIST for post-quantum cryptographic standards) in particular, the ranges from which the coefficients are sampled are $[-\beta,\beta]$ with $\beta \in \{2,4\}$ and $(-\beta,\beta]$ for $\beta \in \{2^{17},2^{19}\}$. While this sampling operation is trivial in the unmasked case, a secure implementation of these digital signature schemes requires the integration of dedicated countermeasures for this step.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme.

There have been multiple proposals to sample masked polynomials required for post-quantum key encapsulation mechanisms (KFM). However, these approaches sample coefficients from a binomial distribution and, therefore, cannot be used for the signature schemes that require uniform coefficients, e.g., DILITHIUM.

The first dedicated masking scheme for a lattice-based signature schemes was presented in Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384, which is incorporated for all purposes as if included herein. To generate arithmetically masked polynomials with coefficients uniform in a given range, the authors propose to use Boolean-masked rejection sampling and adjusting the result using Boolean-masked additions. Finally, the resulting Boolean sharing is converted to arithmetic shares as required by the subsequent masked operations. The same approach was also used for masking qTesla in Francois Gérard and Mélissa Rossi, *An efficient and provable masked implementation of qtesla*, Smart Card Research and Advanced Applications—18th International Conference, ARDIS 2019, Prague, Czech Republic, Nov. 11-13, 2019, Revised Selected Papers (Sonia Belaïd and Tim Güneysu, eds.), Lecture Notes in Computer Science, vol. 11833, Springer, 2019, pp. 74-91, which is incorporated for all purposes as if included herein.

This approach was slightly optimized for masking DILITHIUM in Vincent Migliore, Benoit Gérard, Mehdi Tibouchi, and Pierre-Alain Fouque, *Masking dilithium-efficient implementation and side-channel evaluation*, Applied Cryptography and Network Security—17th International Conference, ACNS 2019, Bogota, Colombia, Jun. 5-7, 2019, Proceedings (Robert H. Deng, Valérie Gauthier-Umaña, Martín Ochoa, and Moti Yung, eds.), Lecture Notes in Computer Science, vol. 11464, Springer, 2019, pp. 344-362.

Embodiments of uniform random sampling of polynomial coefficients will be disclosed herein that improves on the state-of-the-art enabling a significantly more efficient implementation of post-quantum schemes that include sampling polynomials with uniform coefficients and a prime modulus. This is achieved by masked sampling approaches as detailed herein. The embodiments described herein improves both the number of operations and the number of random elements versus the prior approaches.

SecSampleOriginal (defined as arith::generate in Migliore) computes uniformly random integers in a given range and outputs them arithmetically masked. It uses Boolean-masked rejection sampling and almost exclusively operates on Boolean shares. Some of the random bits that are generated, are thrown away. These are the main drawbacks of the algorithm. The new algorithms proposed herein—SecSampleGeneric and SecSampleA2A—employ different strategies to circumvent these issues.

For example, when creating the secret vectors $s_1$ and $s_2$ for NIST level 3 authentication, with a processor word length $\omega=32$ and masking order $d=5$, SecSampleOriginal takes about 32.0 million operations and more than 128.7 million random bits. SecSampleGeneric described herein only takes 17.6 million operations and 70.4 million random bits for the same task.

When sampling the coefficients for the vector y with NIST level 5 authentication, with $\omega=64$ and $d=5$, 32.4 million operations are carried out and 190.6 million random bits are generated for SecSampleOriginal. The algorithm SecSampleGeneric takes less than 20 million operations and only 79.3 million random bits in comparison.

Two different embodiments of sampling methods will be described. The main improvements are the same for both of the new methods. First, a conversion to arithmetic shares happens earlier than in the Migliore algorithm (or arithmetic shares are used right from the start), in order to make the subsequent operations less costly. Second, only as many random bits as are absolutely needed are generated. Last, using a generic addition algorithm is avoided when dealing with constants and instead functions are used that are specifically designed for the parameters of DILITHIUM.

For SecSampleGeneric, the auxiliary function ComputeSignBit is introduced. Depending on the sampling range, this speeds up the Boolean-masked rejection check or eliminates it completely. An algorithm that relies on a fast way to convert from one modulus to another on arithmetic shares (A2A) is also introduced. This allows for only the use of arithmetic instead of Boolean shares, which eliminates the need for Boolean-masked rejection sampling for any range. Instead, the rejection sampling may be done share-wise that is much more efficient. Depending on the availability of a fast A2A conversion, e.g., through hardware acceleration, SecSampleA2A may potentially surpass SecSampleGeneric, both in terms of speed and complexity of randomness.

In the key generation and signing process of DILITHIUM, the secret vectors $s_1$, $s_2$ and y are randomly generated. Their entries are polynomials in $R_q=(\mathbb{Z}/q\mathbb{Z})[X]/(X^{256}+1)$ with $q=2^{23}-2^{13}+1$, whose coefficients are sampled uniformly from certain ranges. As described earlier, these coefficients must remain secret to ensure the security of the signature scheme. A common approach is to split up the sensitive values into Boolean or arithmetic shares. A Boolean or arithmetically masked variable x are denoted as $x^{(\cdot)B}$ or $x^{(\cdot)A}$ respectively, with $\oplus_{i=0}^{n_s-1} x^{(i)B}=x$ or $\Sigma_{i=0}^{n_s-1} x^{(i)A}=x \bmod q$ respectively ($n_s$ being the number of shares). Additionally $x_i^{(j)B}$ is defined as the i-th bit of the j-th Boolean share of x. $x_i^{(\cdot)B}$ is the vector of i-th bits of all shares of x. Bits are counted from least to most significant (right to left), starting with 1.

Because of the specific parameter choices in DILITHIUM, four different situations may occur. For $s_1$ and $s_2$, samples are selected uniformly from $[-\beta,\beta]$ with $\beta\in\{2,4\}$. These ranges include a non-power-of-two number of possible values, which makes it necessary to employ rejection sampling. On the other hand, the coefficients of y lie in $(-\beta,\beta]$ for $\beta\in\{2^{17},2^{19}\}$. This means there are $2^{18}$ or $2^{20}$ possible values, which allows the rejection step to be skipped entirely, as described further on.

The function SecSampleGeneric will first be described. A listing of pseudocode for SecSampleGeneric is provided below. To accommodate the different sampling ranges, the bound $\beta$ as well as the additional input $\tau\in\{0,1\}$ are input to SecSampleGeneric. The variable $\beta$ is the bound of the sample range $[-\beta,\beta]$ or $(-\beta,\beta]$. In DILITHIUM, only the values 2, 4, $2^{17}$ and $2^{19}$ are possible. The variable $\tau$ indicates whether the lower bound of the sample range is included ($\tau=0$) or excluded ($\tau=1$). First, in the following description let $\tau=0$ (i.e., samples for $s_1$ and $s_2$ are being selected). On line 1, the function NumberOfBits outputs the number of bits necessary to write $\beta$ in a binary representation. The variable m controls the number of random bits per Boolean share and therefore the initial sample range of SecSampleGeneric. With the DILITHIUM parameters $m\in\{3,4,18,20\}$, which are the values calculated on line 1. So m is the smallest integer such that $2^m-1\geq 2\beta$. On line 2, a repeat loop is started that repeats until the ComputeSignBit function returns a value of 1 indicating that the resulting coefficient is within the desired range. On line 3 a loop is started that loops through each of the $n_s$ shares. The variable $n_s$ is the number of Boolean or arithmetic shares used in the sharing of the secret coefficients. Increasing this value will improve the side-channel security, but also lower the performance of the algorithm. On line 4 the Boolean share to be generated is initialized to a bitstring of $\omega$ zeros. On line 5 a function $\text{rand}_B$ is used to create a bit string of $\omega-m$ zeros followed by m random bits. This restricts $x^{(\cdot)B}$ to the range $[0,2^m-1]$. The function ComputeSignBit in line 7 returns the sign bit of $x-2\beta-1$. The repeat-until loop is exited, when the sign bit is 1 that indicates that $x\in[0,2\beta]$. On line 8, a conversion from Boolean to arithmetic shares is carried out using the function B2A. B2A converts $n_s$ Boolean shares $x^{(\cdot)B}\in\mathbb{F}_2^{n_s}$ arithmetic shares $x^{(\cdot)A}\in\mathbb{Z}_q^{n_s}$, which encode the same secret coefficient $x\in\mathbb{Z}_q$. This conversion may be done using any known method for such a conversion. On line 9, the value $x^{(0)A}$ (and therefore $x^{(\cdot)A}$ as a whole) is shifted down by $-\beta$ into the range $[-\beta,\beta]$. On line 10, the value of $x^{(\cdot)A}$ is returned, which is an array of $n_s$ arithmetic shares of the single coefficient x.

The coefficients of the secret vector y are supposed to lie in $(-2^\gamma,2^\gamma]$ with $\gamma\in\{17,19\}$. As result, the exclusion of the lower bound is implemented by setting $\tau=1$. In line 1, m is now $\gamma+1$, so the range of possible values for x in line 5 is $[0, 2^{\gamma+1}-1]$. ComputeSignBit is designed to immediately output 1 in this case, because the range of values does not need to be restricted any further. The repeat-until loop is always exited after one iteration. The lines 8 and 9 simply convert B2A and translate down to the right range of values, just as before.

---
Function SecSampleGeneric($\beta$, $\tau$)

Input: Sample range $\beta$, Lower bound toggle $\tau$.
Output: A single coefficient $x^{(\cdot)A}$, arithmetically masked.

| | | |
|---|---|---|
| 1: | m = NumberOfBits($\beta$) + 1 − $\tau$ | |
| 2: | repeat | |
| 3: |   for i = 0,..., $n_s$ − 1 do | |
| 4: |     $x^{(i)B}$ = 0 | Initialize as a bitstring of $\omega$ zeros. |
| 5: |     $x^{(i)B}$ = rand$_B$(m) | $x \in [0, 2^m - 1]$ |
| 6: |   end for | |
| 7: | until ComputeSignBit($x^{(\cdot)B}$, $\beta$) = 1 | iff $x \in [0, 2\beta - \tau]$ |
| 8: | $x^{(\cdot)A}$ = B2A($x^{(\cdot)B}$) | |
| 9: | $x^{(\cdot)A}$ = $x^{(\cdot)A}$ − $\beta$ + $\tau$ | $x \in [-\beta + \tau, \beta]$ |
| 10: | return $x^{(\cdot)A}$ | |
---

The function SecSampleA2A will next be described. A listing of pseudocode for SecSampleA2A is provided below. Another approach different than that described in SecSampleGeneric is to use arithmetic shares right from the start. As with SecSampleGeneric, it is desired to be able to sample from $[-\beta,\beta]$ and $(-\beta,\beta]$ using the same function with the extra input $\tau$. On line 1 a loop is started that loops through each of the $n_s$ shares. For each iteration of the loop on line 2 an arithmetic share is randomly generated. The function rand$_a(\lambda)$ is defined to output shares of an arithmetically masked, uniformly sampled integer $x = \Sigma x^{(i)A}$ mod $\lambda$. This can be achieved with rejection sampling for each share, if $\lambda$ is not a power-of-two (i.e., the function repeatedly generates random values until one is in the desired range.) Note that this rejection sampling step does not need to be explicitly masked like in the prior approaches, and, therefore, requires fewer operations and less randomness. After the loop completes, on line 4 the randomly generated shares are converted to arithmetic shares mod q using the A2A function. A2A converts $n_s$ arithmetic shares $x^{(\cdot)A} \in \mathbb{Z}_q^{n_s}$ modulo q to $n_s$ arithmetic shares $x^{(\cdot)A} \in \mathbb{Z}_p^{n_s}$ modulo p with p>q, which encode the same secret coefficient $x \in \mathbb{Z}_q$. Then on line 5 the arithmetic shares are shifted down by $-\beta+\tau$ as was done for SecSampleGeneric. On line 6, the value of $y^{(\cdot)A}$ is returned, which is an array of $n_s$ arithmetic shares of the single coefficient y.

---
Function SecSampleA2A($\beta$,$\tau$)

Input: Sample range $\beta$, Lower bound toggle $\tau$.
Output: A single coefficient $y^{(\cdot)A}$, arithmetically masked.

| | | |
|---|---|---|
| 1: | for i = 0,..., $n_s$ − 1 do | |
| 2: |   $x^{(i)A}$ = rand$_A$(2$\beta$ + 1 − $\tau$) | mod (2$\beta$ + 1 − $\tau$) |
| 3: | end for | |
| 4: | $y^{(\cdot)A}$ = A2A($x^{(\cdot)A}$) | mod (2$\beta$ + 1 − $\tau$) → mod q |
| 5: | $y^{(\cdot)A}$ = $y^{(\cdot)A}$ − $\beta$ + $\tau$ | |
| 6: | return $y^{(\cdot)A}$ | |
---

The function ComputeSignBit will next be described. A listing of pseudocode for ComputeSignBit is provided below. The function ComputeSignBit illustrated below is specifically designed for the parameters of DILITHIUM. The function of ComputeSignBit may be adapted for other signature protocols. The input is a Boolean masked integer x and another integer $\beta \in \{2, 4, 2^{17}, 2^{19}\}$. For the two smaller values it outputs the sign bit of $x-2\beta-1$. For the two larger values it always outputs 1, as previously explained in the description of SecSampleGeneric. For this function to work properly, two's complement representation of signed integers is assumed, so the top bit gives us the sign (1 for negative values, 0 for non-negative values). On line 1, $\gamma$=log $\beta$ is calculated. For DILITHIM, this means that y may have the values 1, 2, 17, and 19. On line 2 it is determined if $\gamma$=1, and if so the value of Boolean expression of line 3 is returned. On line 4 it is determined if $\gamma$=2, and if so the value of Boolean expression of line 5 is returned. Otherwise, the value of 1 is returned on line 7. The Boolean expressions on lines 3 and 5 are the negation of the last carry in the addition of $-2\beta-1$ and x. By writing down the step-by-step binary addition, it can be shown that this is exactly the sign bit of the sum.

The Boolean expressions on lines 3 and 5 use the functions SecAnd, SecOr, and ¬. These are defined as follows:

SecAnd: This function computes the bit-wise AND of two given Boolean-shared inputs in a masked fashion. The embodiments described herein are independent of the actual implementation of this function and may utilize any of the existing solutions, as long as it provides the desired security.

SecOr: Similar to SecAnd, but for the bit-wise OR. This function may be implemented using de Morgan's law $P \vee Q = \neg(\neg P \wedge \neg Q)$ with SecAnd.

¬: The function computes the bit-wise negation of the input bitstring. When applied to a Boolean-shared input only one share has to be negated, because $\neg(P \oplus Q) = (\neg P) \oplus Q$.

---
Function ComputeSignBit($x^{(\cdot)B}$, $\beta$)

| | |
|---|---|
| 1: | $\gamma$ = log $\beta$ |
| 2: | if $\gamma$ = 1 then |
| 3: |   return ¬SecAnd($x_3^{(\cdot)B}$, SecOr($x_2^{(\cdot)B}$, $x_1^{(\cdot)B}$)) |
| 4: | else if $\gamma$ = 2 then |
| 5: |   return ¬SecAnd($x_4^{(\cdot)B}$, SecOr($x_3^{(\cdot)B}$, SecOr($x_2^{(\cdot)B}$, $x_1^{(\cdot)B}$))) |
| 6: | else |
| 7: |   return 1 |
| 8: | end if |
---

The correctness of the SecSampleGeneric function will now be described. After line 5 and by the definition the value output by rand$_B$, $x^{(\cdot)B}$ lies in the range $[0, 2^m-1]$. When $\beta \in \{2,4\}$ (and $\tau$=0), the check in line 7 passes if and only if $x \in [0, 2\beta]$. For $\beta \in \{2^{17}, 2^{19}\}$ (and $\tau$=1), it always passes. In any case, $x \in [0, 2\beta-\tau]$. Line 9 adds $-\beta+\tau$, so that $x \in [-\beta+\tau, \beta]$. If $\tau$=0, the result is $x \in [-\beta,\beta]$, in and for $\tau$=1 the result is $x \in [-\beta+1, \beta] = (-\beta, \beta]$. Furthermore, if it is assumed that rand$_B$ is uniformly distributed for a fixed input, then x is too because there is a shift the range of values and some values are not used.

The correctness of the SecSampleA2A function will now be described. According to the definition of randA, the for loop produces $x \in [0, 2\beta-\tau]$. Line 4 only changes the modulus, so y lies in the same range. In the last line the value of y is shifted to $y \in [-\beta+\tau, \beta]$. Considering the input $\tau \in \{0,1\}$, this is the desired range.

A comparison between SecSampleGeneric and SecSampleOriginal will now be performed. While SecSampleOriginal was not built to sample from an interval of the form $(-\beta, \beta]$, it could be tweaked slightly to achieve this goal, without changing any of its properties. Additionally, one would have to introduce a line that inverts the mask created in line 13 in Migliore, because the given pseudocode samples from $[\beta+1,2\beta] \cup [q-2\beta-1, q-\beta-1]$. With these changes in mind SecSampleOriginal may be compared to functions described herein.

Let $n_s$ be the number of Boolean or arithmetic shares, $\omega$ be the word length of the processor (usually 32 or 64 bit), l=log $\omega$−1. Additionally define $n_f$ to be the number of operations for a function f. Depending on the value of $\beta$, the number of operations varies for some functions. On the one hand ComputeSignBit executes different branches, and on the other hand the number of iterations of the rejection loop changes. If all this is taken into consideration, the numbers given in tables 1, 2 result. In comparison, for SecSampleOriginal we get $$n_s^2\left(\frac{9}{2}\omega + 34l + \frac{63}{2}\right) + n_s\left(\frac{5}{2}\omega - 14l + \frac{27}{2}\right) - 3\omega + 8l - 2,$$

and for SecSampleA2A we have $n_{A2A}+n_s+1$. To further illustrate the advantage of the functions described herein, two examples will be presented.

TABLE 1

Number of operations for functions independent of $\beta$.

| Function | Number of Operations |
|---|---|
| +, −, ∧, ⊕ | 1 |
| NumberOfBits | 0 |
| $rand_A$, $rand_B$ | 1 |
| SecAnd | $\dfrac{7n_s^2 - 5n_s}{2}$ |
| SecOr | $n_{SecAnd} + 3$ |
| B2A | $\dfrac{9}{2}\omega n_s^2 + n_s\left(\dfrac{5}{2}\omega - 2\right) - 3\omega$ |
| A2B | $n_s^3\left(\dfrac{17}{n}l + 7\right) - n_s^2(12l + 4) + n_s\left(\dfrac{11}{2}l - 3\right) - 2l$ |
| A2A (worst case) | $n_{A2B} + n_{B2A}$ |

TABLE 2

Number of operations for ComputeSignBit and SecSampleGeneric, for different values of $\beta$.

| | ComputeSignBit | SecSampleGeneric |
|---|---|---|
| $\beta = 2$ | $2 + n_{SecAnd} + n_{SecOr}$ | $n_s^2\left(\dfrac{9}{2}\omega + 14\right) + n_s\left(\dfrac{5}{2}\omega - 10\right) - 3\omega + 14$ |
| $\beta = 4$ | $2 + n_{SecAnd} + 2n_{SecOr}$ | $n_s^2\left(\dfrac{9}{2}\omega + 21\right) + n_s\left(\dfrac{5}{2}\omega - 15\right) - 3\omega + 20$ |
| $\beta \in \{2^{17}, 2^{19}\}$ | 1 | $\dfrac{9}{2}n_s^2\omega + n_s\left(\dfrac{5}{2}\omega - 1\right) - 3\omega + 5$ |

In example 1, the secret vectors $s_1$ and $s_2$ for NIST level 3 and $\omega$=32 are calculated. Together they consist of 11 polynomials with 256 coefficients each, so there are 2816 coefficients in total. They are sampled from the range [−4,4]. In the results the functions SecSampleGeneric and SecSampleA2A always require fewer calculations than SecSampleOriginal. As the number of shares increase, the difference increases. To show the potential of SecSampleA2A, in the worst case $n_{A2A}=n_{A2B}+n_{B2A}$, but the more optimistic $n_{A2A}=n_{B2A}$ were assumed.

In example 2, the secret vector y is calculated for NIST level 5 and $\omega$=64. It consists of 7 polynomials with 256 coefficients each, so there are 1792 coefficients in total. They are sampled from the range $(-2^{19}, 2^{19}]$. Again, the results show that SecSampleGeneric requires fewer operations.

Next, the number of random bits that need to be generated in SecSampleOriginal versus SecSampleGeneric are compared. SecSampleOriginal generates a lot of random bits unnecessarily, because they are immediately discarded by applying a mask. In SecSampleGeneric only as many bits as needed are created and the rest of the bits are filled up with zeros (see lines 4 and 5 in SecSampleGeneric pseudocode). The comparative results are summarized in tables 3 and 4. There, $r_f$ denotes the number of random bits for a function f. If the two example cases from before are considered, there is a similar reduction in the number of random bits as in the number of operations.

TABLE 3

Number of random bits for functions independent of $\beta$.

| Function | Number of Random Bits |
|---|---|
| $rand_A$ | $\omega$ |
| SecAnd, SecOr | $\dfrac{\omega}{2}\left(n_s^2 - n_s\right)$ |
| B2A | $23\omega(n_s^2 - n_s)$ |
| A2B | $n_s^3\omega\left(\dfrac{3}{2}l + 1\right) - n_s^2\omega(3l + 1) + \dfrac{3}{2}ln_s\omega$ |
| A2A (worst case) | $r_{A2B} + r_{B2A}$ |

TABLE 4

Number of random bits for ComputeSignBit and SecSampleGeneric, for different values of $\beta$.

| | ComputeSignBit | SecSampleGeneric |
|---|---|---|
| $\beta = 2$ | $r_{SecAnd} + r_{SecOr}$ | $25\omega n_s^2 - n_s(25\omega - 6)$ |
| $\beta = 4$ | $r_{SecAnd} + 2r_{SecOr}$ | $26\omega n_s^2 - n_s(26\omega - 8)$ |
| $\beta = 2^{17}$ | 1 | $23\omega n_s^2 - n_s(23\omega - 18)$ |
| $\beta = 2^{19}$ | 1 | $23\omega n_s^2 - n_s(23\omega - 20)$ |

The countermeasures that result from using the embodiments of uniform sampling of coefficients provide a technological advantage over the prior art by providing for countermeasures with fewer calculations and the generation of few random bits. This will allow for lattice based post-quantum cryptography schemes to be implemented in more applications that have limited processing resources.

FIG. 1 illustrates an exemplary hardware diagram 100 for implementing the generation of masked uniformly distributed coefficients including the functions SecSampleGeneric, SecSampleA2A, and ComputeSignBit. As illustrated, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices. The processor may be implemented as a secure processor or may include both a secure processor and unsecure processor.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing the generation of masked uniformly distributed coefficients including the functions SecSampleGeneric, SecSampleA2A, and ComputeSignBit described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions for masked sampling of polynomials for lattice-based cryptography in a processor, the instructions, comprising:
   determining a number m of random bits to be sampled based upon a sample bound parameter $\beta$;
   producing a plurality of Boolean masked shares of a polynomial coefficient each having a determined number m of random bits using a uniform random sampling function;
   determining that the polynomial coefficient is within a range of values based upon the sample bound parameter $\beta$;

converting the plurality of Boolean masked shares of the polynomial coefficient to a plurality of arithmetic masked shares of the polynomial coefficient;

shifting the plurality of arithmetic masked shares based upon the sample bound parameter $\beta$; and performing lattice-based cryptography using masked sampling of the polynomial coefficients using the plurality of shifted arithmetic masked shares.

2. The data processing system of claim 1, further comprising when the polynomial coefficient is not within the range of values, repeating the step of producing a plurality of Boolean masked shares of a polynomial coefficient each having the determined number m of random bits using a uniform random sampling function until the polynomial coefficient is within the range of values.

3. The data processing system of claim 1, wherein m=NumberOfBits($\beta$)+1−$\tau$, where $\tau$ is a bound indicator having a value of 0 or 1 and the function NumberOfBits determines the number of bits needed to represent an input value.

4. The data processing system of claim 1, wherein the plurality of Boolean masked shares of the polynomial coefficient have a value in the range of $[0, 2^m-1]$.

5. The data processing system of claim 1, wherein the range of values is $[0, 2\beta-\tau]$ where $\tau$ is a bound indicator having a value of 0 or 1.

6. The data processing system of claim 1, wherein determining that the polynomial coefficient is within a range of values includes determining the sign bit of x−2$\beta$−1 where x is the polynomial coefficient.

7. The data processing system of claim 1, wherein shifting the plurality of arithmetic masked shares includes shifting one of the plurality of arithmetic masked shares by −$\beta$+$\tau$, where $\tau$ is a bound indicator having a value of 0 or 1.

8. A data processing system comprising instructions embodied in a non-transitory computer readable medium, the instructions for masked sampling of polynomials for lattice-based cryptography in a processor, the instructions, comprising:

producing a plurality of first arithmetic masked shares with a first modulus of a polynomial coefficient each having a value in a range based upon a sample bound parameter $\beta$ by using a uniform random sampling function, wherein outputs of the uniform random sampling function outside the range are rejected;

converting the plurality of first arithmetic masked shares of the polynomial coefficient to a plurality of second arithmetic masked shares of the polynomial coefficient having a second modulus different from the first modulus;

shifting the plurality of second arithmetic masked shares based upon the sample bound parameter $\beta$; and performing lattice-based cryptography using masked sampling of the polynomial coefficients using the plurality of shifted arithmetic masked shares.

9. The data processing system of claim 8, wherein the plurality of first arithmetic masked shares of the polynomial coefficient have a value in the range of $[0, 2\beta+1-\tau]$, where $\tau$ is a bound indicator having a value of 0 or 1.

10. The data processing system of claim 8, wherein shifting the plurality of second arithmetic masked shares includes shifting one of the second plurality of arithmetic masked shares by −$\beta$+$\tau$, where $\tau$ is a bound indicator having a value of 0 or 1.

11. A method for masked sampling of polynomials for lattice-based cryptography, comprising:

determining a number m of random bits to be sampled based upon a sample bound parameter $\beta$;

producing a plurality of Boolean masked shares of a polynomial coefficient each having the determined number m of random bits using a uniform random function;

determining that the polynomial coefficient is within a range of values based upon the sample bound parameter $\beta$;

converting the plurality of Boolean masked shares of the polynomial coefficient to a plurality of arithmetic masked shares of the polynomial coefficient;

shifting the plurality of arithmetic masked shares based upon the sample bound parameter $\beta$; and performing lattice-based cryptography using masked sampling of the polynomial coefficients using the plurality of shifted arithmetic masked shares.

12. The method claim 11, further comprising when the polynomial coefficient is not within the range of values, repeating the step of producing a plurality of Boolean masked shares of a polynomial coefficient each having the determined number m of random bits using a uniform random function until the polynomial coefficient is within the range of values.

13. The method of claim 11, wherein m=NumberOfBits($\beta$)+1−$\tau$, where $\tau$ is a bound indicator having a value of 0 or 1 and the function NumberOfBits determines the number of bits needed to represent an input value.

14. The method of claim 11, wherein the plurality of Boolean masked shares of the polynomial coefficient have a value in the range of $[0, 2^m-1]$.

15. The method of claim 11, wherein the range of values is $[0, 2\beta-\tau]$ where $\tau$ is a bound indicator having a value of 0 or 1.

16. The method of claim 11, wherein determining that the polynomial coefficient is within a range of values includes determining the sign bit of x−2$\beta$−1 where x is the polynomial coefficient.

17. The method of claim 11, wherein shifting the plurality of arithmetic masked shares includes shifting one of the plurality of arithmetic masked shares by −$\beta$+$\tau$, where $\tau$ is a bound indicator having a value of 0 or 1.

18. A method for masked sampling of polynomials for lattice-based cryptography in a processor, the instructions, comprising:

producing a plurality of first arithmetic masked shares of a polynomial coefficient each having a value in a range based upon a sample bound parameter $\beta$ by using a uniform random sampling function, wherein outputs of the uniform random sampling function outside the range are rejected;

producing a plurality of first arithmetic masked shares with a first modulus of a polynomial coefficient each having a value in a range based upon a sample bound parameter $\beta$ by using a uniform random sampling function, wherein outputs of the uniform random sampling function outside the range are rejected; and shifting the plurality of second arithmetic masked shares based upon the sample bound parameter $\beta$; and performing lattice-based cryptography using masked sampling of the polynomial coefficients using the plurality of shifted arithmetic masked shares.

19. The method of claim 18, wherein the plurality of first arithmetic masked shares of the polynomial coefficient have a value in the range of $[0, 2\beta+1-\tau]$, where $\tau$ is a bound indicator having a value of 0 or 1.

20. The method of claim 18, wherein shifting the plurality of second arithmetic masked shares includes shifting one of the second plurality of arithmetic masked shares by $-\beta+\tau$, where $\tau$ is a bound indicator having a value of 0 or 1.

\* \* \* \* \*